US012809860B2

(12) United States Patent
Durg et al.

(10) Patent No.: US 12,809,860 B2
(45) Date of Patent: Nov. 24, 2026

(54) GENERATIVE ARTIFICIAL INTELLIGENCE (AI) BASED INFORMATION RETRIEVAL

(71) Applicant: ACCENTURE GLOBAL SOLUTIONS LIMITED, Dublin (IE)

(72) Inventors: Kishore P. Durg, Bangalore (IN); Surya N S Chavali, Secunderabad (IN); Dharmesh Shah, Mumbai (IN); Swati Sharma, Bangalore (IN); Arvind Maheswaran, Bangalore (IN); Pratik Premchand Jain, Pune (IN); Krishna Kummamuru, Bengaluru (IN); Tabish Sayeed Siddique, Bangalore (IN); Shruti Chhabra, Ghaziabad (IN); Hitesh Bhagchandani, Bangalore (IN); Tamal Das, Bangalore (IN); Ajay Divakar Naik, Bengaluru (IN); Saran Prasad, New Delhi (IN); Vinu Varghese, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 268 days.

(21) Appl. No.: 18/520,701

(22) Filed: Nov. 28, 2023

(65) Prior Publication Data

US 2025/0173330 A1 May 29, 2025

(51) Int. Cl.
*G06F 16/2452* (2019.01)
*G06F 16/242* (2019.01)
*G06F 40/40* (2020.01)

(52) U.S. Cl.
CPC .... *G06F 16/24522* (2019.01); *G06F 16/2425* (2019.01); *G06F 40/40* (2020.01)

(58) Field of Classification Search
CPC ........... G06F 16/24522; G06F 16/2425; G06F 40/40; G06F 16/243
See application file for complete search history.

(56) References Cited

U.S. PATENT DOCUMENTS

| | | | | |
|---|---|---|---|---|
| 11,855,860 | B1 * | 12/2023 | Kumar | G06N 3/0455 |
| 12,211,502 | B2 * | 1/2025 | Garcia | G10L 15/22 |
| 2024/0378306 | A1 * | 11/2024 | Lyle | G06F 21/6218 |
| 2025/0077511 | A1 * | 3/2025 | Zhao | G06F 16/24522 |
| 2025/0077792 | A1 * | 3/2025 | Chen | G06N 3/045 |
| 2025/0086394 | A1 * | 3/2025 | Reddy | G06F 40/279 |
| 2025/0117411 | A1 * | 4/2025 | Mohammed | G06F 16/3329 |
| 2025/0119396 | A1 * | 4/2025 | Taheri | H04L 51/02 |
| 2025/0156574 | A1 * | 5/2025 | Eberlein | G06F 16/9535 |
| 2025/0165714 | A1 * | 5/2025 | Krabach | G06F 40/30 |

* cited by examiner

*Primary Examiner* — Richemond Dorvil
*Assistant Examiner* — Zeeshan Mahmood Shaikh
(74) *Attorney, Agent, or Firm* — Mannava & Kang, P.C.

(57) ABSTRACT

A Generative Artificial Intelligence (Gen. AI) based chatbot apparatus implements classical AI models and Generative AI models to answer user queries with results retrieved from relational databases and unstructured knowledge bases. When a user query is received, it is determined if the intent of the user query can be determined with a confidence greater than a configured confidence limit. If yes, a structured query mapped to the intent is employed to answer the user query. If the intent determination confidence is less than the configured confidence limit then Gen. AI-based techniques using a plurality of LLMs are used to respond to the query. A Gen. AI switch is also implemented to switch between the plurality of LLMs to answer user queries with greater accuracy.

20 Claims, 10 Drawing Sheets

GENERATIVE ARTIFICIAL INTELLIGENCE (AI) BASED INFORMATION RETRIEVAL

BACKGROUND

Generative Artificial Intelligence (Gen. AI) refers to AI methodologies that can be used to create new content. Gen. AI is powered by very large machine learning (ML) models that are pre-trained on vast amounts of data via self-supervised or semi-supervised learning, commonly referred to as foundation models (FMs). FMs generate output from inputs provided in human language instructions. FMs are based on complex neural networks including generative adversarial networks (GANs), transformers, and variational encoders. Accordingly, LLMs are AI models with billions or even trillions of parameters. It is the rapid advances in LLMs that have opened a new era in which Gen. AI models can generate textual, audio, graphics, or video content. Gen. AI starts with a prompt that could be in the form of a text, an image, a video, a design, musical notes, or any input that the AI system can process. Various AI algorithms then return new content in response to the prompt.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
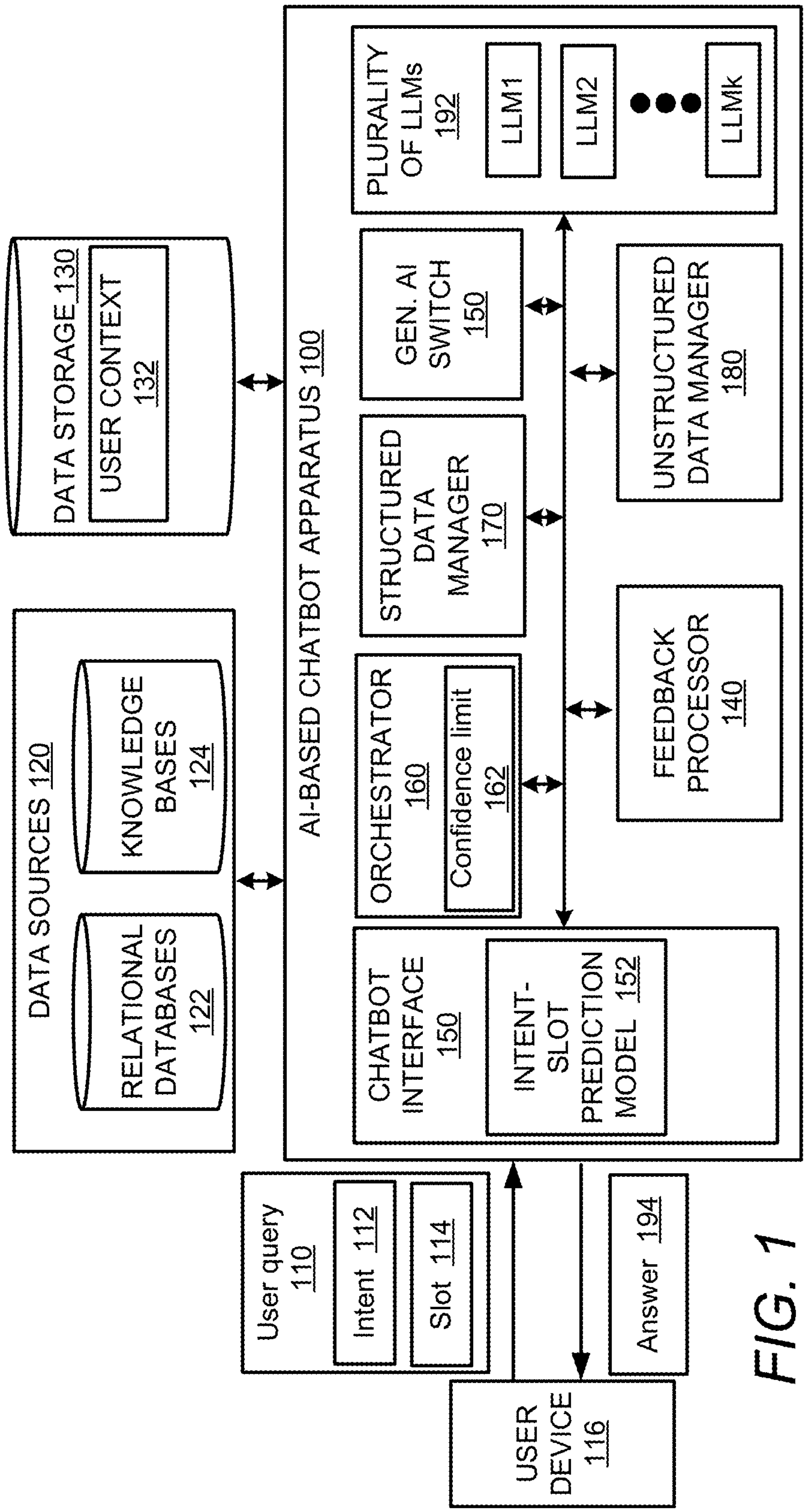
FIG. 1 illustrates a block diagram of a Gen. AI-based chatbot apparatus in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms “a” and “an” are intended to denote at least one of a particular element. As used herein, the term “includes” means includes but not limited to, the term “including” means including but not limited to. The term “based on” means based at least in part on.

1. Overview

Gen. AI-based chatbot apparatus responds to a received user query by employing classical AI techniques as well as Gen. AI techniques. A chatbot input interface is used to receive the user query which may include an intent and a slot. The user query can be received as a voice input or a textual input that conveys via the intent, the user’s requirement for at least one task to be executed. The task may pertain to retrieval and/or analysis of data from a plurality of data sources. The plurality of data sources may include relational databases and knowledge bases. The relational databases may include structured data generated, manipulated, and used in transactions. The knowledge bases can store unstructured domain-based knowledge such as process information, user profile information, and metadata related to the transactions including session information, the database schema of the relational databases, etc. The slot in the user query can act as a filter to extract data from one or more of the plurality of data sources. Therefore, the slot can convey an identity of the data source which may include one or more of the relational databases and the knowledge bases that can be used for carrying out the task conveyed in the intent. Furthermore, depending on the context, the slot can also convey features of the data or relevant entities from the data sources which can be used as filters to retrieve data responsive to the user query.

When the user query is received, it is provided to an intent-slot prediction model for extracting the intent and the slot. In an example, the intent-slot prediction model implements classical AI techniques for the prediction of the intent and identification of the slot. Additionally, the intent-slot prediction model also outputs confidence related to the accuracy of the intent predictions. This confidence is compared to a threshold such as a configured confidence limit. If the confidence of the intent prediction is equal to or above the configured confidence limit, an answer to the user query can be generated using structured queries on the relational databases or using LLM based approach on unstructured databases as per configuration. If the confidence of the intent prediction is below the configured confidence limit, one or more of a plurality of large language models (LLMs) may be employed to automatically generate the structured queries using the knowledge bases, and the automatically-generated structured queries are in turn used to retrieve results from the relational databases. The chatbot interface formats the retrieved results to provide an answer to the user query.

When the confidence of the intent prediction is above the configured confidence limit, a mapping of the intents and the structured queries and/or search queries/terms that can carry out the tasks conveyed by the intents is accessed. The intent extracted from the user query is matched to one of the intents from the intent-query mappings. The corresponding structured query or search query is retrieved from the intent-query mappings and executed on one of the relational databases or the unstructured knowledgebases to retrieve results responsive to the user query. The chatbot interface may format the retrieved results to form an answer to the user query. The answer may be provided as a textual output, voice output, etc.

When the confidence of the intent prediction is below the configured confidence limit, the user query is provided via a prompt to a selected one of the plurality of LLMs. A prompt is natural language text describing the task that should be performed by an LLM. A prompt can be a query, a command, a short statement of feedback, or a longer statement including context, instructions, and input data.

Particularly, a prompt generated from the data of the user query can be provided to an LLM. The LLM is trained to automatically generate a structured query (e.g., Structured Language (SQL) Query) for the intent or to carry out the task conveyed in the user query. The LLM can be trained on various forms that user queries can take or the various ways in which the intents can be conveyed for executing various tasks. Additional parameters for the training can include at least user profile information and the database schema of the relational database which includes the results responsive to the user query. The user profile information can include a user's role and the access privileges associated therewith. The database schema can include database configuration information such as but not limited to the number of columns, column names, relations such as primary key, foreign key references, etc. In an example, the structured query thus automatically generated is executed on one or more tables of the relational databases to create the results which can be formatted into the answer for the user query. Furthermore, the plurality of LLMs can include subsets of customized LLMs wherein each subset is customized for a given domain, wherein each LLM within the subset of customized LLMs is further trained to identify a corresponding intent.

If the structured query cannot be automatically generated by the currently selected LLM, another prompt may be issued to divide the task into a sequence of subtasks. Particularly, the LLM can be prompted for the steps involved in achieving the task conveyed in the intent thus obtaining the sequence of subtasks. Prompts are then generated to obtain the structured query for each of the subtasks thereby generating multiple structured queries. The multiple structured queries can be executed on one or more tables of the relational databases for retrieval of responsive results. Different prompting strategies would provide answers with their corresponding confidence scores and the response with the highest score is selected. If a structured query cannot be generated by the prompt, the prompt containing the instructions is processed through an augmented retrieval process wherein similar documents are retrieved through the knowledge bases and those documents which satisfy a similarity threshold may be processed through the currently-selected LLM for the answer. The answer thus generated can be provided to the user via an output screen of the chatbot interface. Feedback is also collected from the users for the answers provided, and based on the feedback the LLM used for responding to user queries can be switched to a different LLM.

The Gen. AI chatbot apparatus and methods disclosed herein provide a technical solution wherein existing computing systems using classical AI models are enabled to be forward compatible with LLMs based on Gen. AI techniques. Usage of different LLMs lends the power of Gen. AI techniques to process user queries issued in a natural language besides allowing users to frame queries differently for the same intent. Training LLMs to produce structured queries enables leveraging Gen. AI techniques for improving classical data retrieval methodologies. Furthermore, providing for the collection of user feedback and switching between the LLMs based on the user feedback configures the Gen. AI chatbot apparatus for improving over time with usage.

2. System Architecture

FIG. 1 illustrates a block diagram of a Gen. AI-based chatbot apparatus 100 with a chatbot interface 150 in accordance with the examples disclosed herein. The apparatus 100 receives an input including a user query 110 for retrieving information from one or more data sources 120 which may include relational databases 122 wherein the information is stored in a structured format including tables and knowledge bases 124 wherein the information is stored in an unstructured format. In an example, the knowledge bases 124 can include not only textual documents but also images e.g., non-searchable documents and audio and video content. The user query 110 is analyzed to determine if one or more of an intent 112 and a slot 114 can be predicted and information is retrieved from the data sources 120 based on an accuracy of the prediction of the intent 112 and the slot 114. The answer 194 can be provided as an output via the chatbot interface 150. In an example, the user query 110 can be received via a user device 116 logged into the apparatus 100 from a particular user profile. In an example, the apparatus 100 can be communicatively coupled to a data storage 130 that stores data generated and used by the apparatus 100.

The apparatus 100 includes an input/output (I/O) interface such as the chatbot interface 150, an orchestrator 160, a structured data manager 170, an unstructured data manager 180, a Generative AI ("Gen. AI") switch 190, and a feedback processor 140. In an example, the chatbot interface 150 can include an intent-slot prediction model 152 which predicts the intent 112 and the slot 114 from the user query 110. In an example, the intent-slot prediction model 152 can be trained on labeled training data including various user queries/user inputs/user utterances and corresponding intents and slots. For example, the same intent can be conveyed through utterances or queries framed with different words. Accordingly, the intent-slot prediction model 152 is trained to identify the intent 112 accurately from various types of utterances using different words. In an example, the intent-slot prediction model 152 implements classical AI techniques such as but not limited to, neural nets, Support Vector Machines (SVM), or deep learning models such as Bidirectional Encoder Representations from Transformers (BERT).

The intent-slot prediction model 152 can also be configured to output the confidences associated with the accuracy of predictions. The user query 110 along with the predicted intent 112 and slot 114 with corresponding confidences are provided to the orchestrator 160. The orchestrator 160 can compare the intent prediction confidence to a confidence limit 162 configured therein. If the confidence of the intent prediction is higher than the confidence limit 162, the intent 112 and the slot 114 are provided to the structured data manager 170 for information retrieval. The data responsive to the user query 110 can be obtained from an appropriate one of the data sources 120 identified by the slot 114 and provided to the user device 116 via the chatbot interface 150. If the intent prediction confidence is lower than the confidence limit 162, the user query 110 is provided to the unstructured data manager 180 for determining the intent 112. The intent 112 may be inherently associated with the slot 114 as the intent is indicative of a task which can be domain-specific. For example, the terminology to convey intents in different domains may differ and therefore, the accuracy of intent prediction can inherently depend on the accuracy of slot prediction or vice versa.

In an example, additional data such as a user context 132 which includes user role and session information can be used for intent/slot determination by the unstructured data manager 180. The user context 132 can be retrieved from the knowledge bases 124 which include domain-specific knowledge in structured or unstructured formats. The user context 132 data can be retrieved using, for example, the user's login information. The unstructured data manager 180 via the Gen. AI switch 190 employs one of a plurality of LLMs 192 e.g., LLM1, LLM2, . . . , LLMk (wherein k is a natural number greater than 1) for obtaining the data requested in the user query 110 from one or more of the data sources 120. The plurality of LLMs 192 can be trained for generating structured queries for extraction of data from the one or more data sources 120 for different intents, different domains, etc.

The unstructured data manager 180 can also prompt the LLM providing the structured query for retrieving the data from the relational databases 122 to also provide the corresponding confidence score that the query provided is responsive to the intent conveyed in the user query 110. In case the confidence score associated with the query is less than a predetermined threshold confidence score and if no query can be generated, then further processes which may also include an augmented retrieval process are employed with the prompt containing instructions to get the answers from the one or more of the plurality of data sources 120. Based again on the predetermined threshold confidence score, only chunks from the knowledge bases 124 having a predefined level of similarity with the intent 120 are used for answering the user query 110. In case no relevant chunks are available, the LLM is prompted to answer the subtask and instructed to explain the answer 194. Generally, the answer 194 can be provided as a textual output on a display screen of the user device 116. However, the chatbot interface 150 may also be enabled for voice interaction via, for example, text-to-voice and/or voice-to-text converters, so that the user query 110 can be received as an audio input and the answer 194 is provided as a voice output to the user device 116 by the chatbot interface 150. Wherever necessary, the chatbot interface 150 can also be configured to identify videos from one or more of the plurality of data sources 120 and output the videos through the chatbot interface 150.

The feedback from the user for the answer 194 can be received by the feedback processor 140. Users can provide feedback for each response by tagging it as thumps up and thumps down. They can also provide longer textual feedback for each session. The feedback can indicate whether or not the retrieved information is responsive to the user query 110. Feedback can be used as a mechanism to fine-tune the prompt for queries where data from the knowledge bases 124 has to be fetched for known intents. Answers with high negative feedback counts are added to the prompt so that the currently selected LLM can provide better results. An example prompt providing feedback may have the format:

<Role>
<Task>
<Instruction>
<Context>
<Format Instructions>
Previous Answer: <Previous Answer>
Feedback: Negative
Answer:

In the above example, role is the profile which the user may have logged in e.g., manager, sales assistant, system administrator, etc. The 'task' is the intent or the function to be executed, the 'instruction' may detail how the task is to be executed. In an example, the instruction may include slot information e.g., a data source to be used, the 'context' includes DB schema information, session metadata, etc., the 'format instructions' may detail the format in which the user likes to receive the answer, the 'previous answer' is the prior answer received by the user and the 'feedback' is the user's reaction to the previous answer. The 'answer' is the response that was expected by the user. Similarly, query-response pairs for queries with unknown intents and having positive feedback can also be used to fine-tune one or more of the plurality of LLM models 192.

If the feedback from a predetermined number of users is negative indicating that the answer 194 is not responsive to the user query 110, the retrieved information/answer with the high negative feedback can be added to the prompt to increase the likelihood that the non-responsive LLM is not selected for similar user inputs that may be received in future. If the feedback from a predetermined number of users is positive indicating that the retrieved information/answer 194 is responsive to the user query 110, the answer with the high positive feedback can be used with the query that generated information in the positively-reviewed answer so that the responsive LLM is selected for similar user inputs that may be received in future. Thus, regular monitoring and analysis of free-text feedback helps to identify the gaps in the chatbot. New topics can be identified through LLM prompting with few-shot prompting or classical topic modeling techniques. Few-shot prompting can be used as a technique to enable in-context learning where demonstrations are provided in the prompt to steer the model to better performance. The demonstrations serve as conditioning for subsequent examples where the model is to generate a response. New intents can be added to address prominent gaps to improve the accuracies of the LLMs.

The selection/de-selection of the plurality of LLMs 192 is carried out by the Gen. AI switch 190. The Gen. AI switch 190 can be configured in a rule-based process or programmatically to select a particular one of the plurality of LLMs 192 based on the slot 114 and the intent 112 obtained from the user input. In an example, each LLM of the plurality of LLMs 192 can be trained to provide a query for retrieving information from the relational databases 122. The plurality of LLMs 192 can include LLMs trained for particular domains, e.g., oil and gas domain, retail domain, healthcare domain, etc. The plurality of LLMs 192 can also include models that are customized to particular organizations so that such models can handle proprietary or confidential information. The rule-based process may implement a hierarchy in the selection to narrow down the LLM that will be used based at least on configuration details such as industry, region, functional domains within an organization, etc., in addition to user feedback. The different types of LLMs used in the plurality of LLMs 192 may include Jurassic-2 Ultra®, GPT-4®, BARD®, Cohere®, PaLM®, and Claude v1®, etc. Therefore, even as new LLMs are introduced, such LLMs may be incorporated into the apparatus 100 without significant re-configuration so that the apparatus 100 maintains forward compatibility. In an example, LLMs that may be particularly suited for structured query generation, such as but not limited to, Jurassic-2 Ultra may be frequently selected by the Gen AI switch 190.

Figure 2:
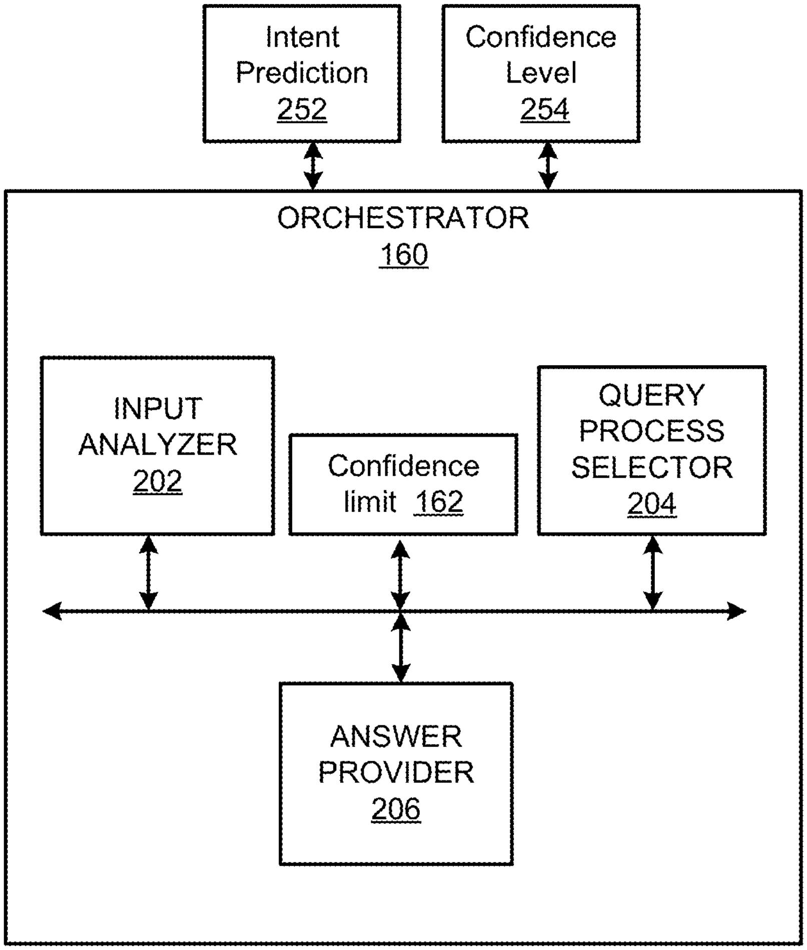
FIG. 2 shows a block diagram of an orchestrator in accordance with the examples disclosed herein.

FIG. 2 shows a block diagram of the orchestrator 160 in accordance with the examples disclosed herein. The orchestrator 160 includes an input analyzer 202, a query process selector 204, and an answer provider 206. The input analyzer 202 receives the intent prediction 252 and the corresponding confidence level 254 from the chatbot interface 150. The confidence level 254 is compared by the input analyzer 202 with the confidence limit 162 configured therewithin. If the confidence level 254 equals or exceeds the confidence limit 162, then it is determined that the intent 112 is known. If the confidence level 254 falls below the confidence limit 162, then it is determined that the intent 112 is unknown. The data regarding the known intent and the unknown intent is provided to the query process selector 204.

The query process selector 204 selects to process the user query 110 by one of the structured data manager 170 or the unstructured data manager 180. If the intent 112 is known, then the structured data manager 170 is selected for further processing. However, if the intent 112 is unknown (i.e., cannot be determined with a confidence above the confidence limit 162) then the user query 110 is processed via the unstructured data manager 180 for retrieval of the query results. The answer provider 206 receives the query results from one of the structured data manager 170 or the unstructured data manager 180 and forwards the query results to the chatbot interface 150 for presentation on the user device 116 in one or more of text, audio, or video formats as the answer 194. In an example, the answer 194 may be composed as an email that the user can review and send out, or the answer 194 may trigger an action on a downstream Enterprise Resource Planning (ERP) system. When presented as an audio response or a video, the answer 194 may bring up interactive dashboard reports for the user to perform analysis and derive insights, etc.

Figure 3:
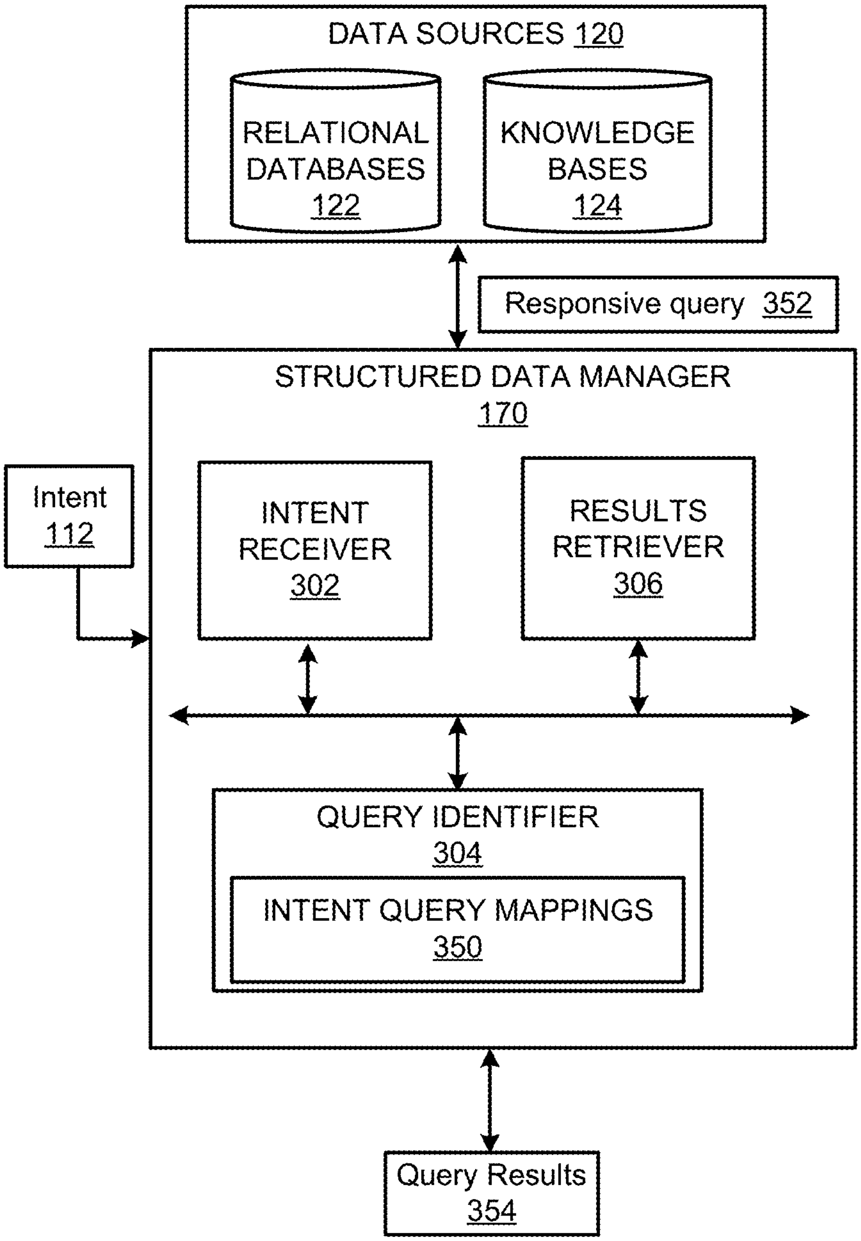
FIG. 3 shows a block diagram of a structured data manager in accordance with the examples shown herein.

FIG. 3 shows a block diagram of the structured data manager 170 in accordance with the examples shown herein. The structured data manager 170 includes an intent receiver 302, a query identifier 304, and a results retriever 306. The intent receiver 302 receives the intent 112 identified by the intent-slot prediction model 152 with confidence above the confidence limit 162 from the user query 110. In an example, the intent 112 can include one or more words that convey a task to be executed. The intent 112 thus extracted from the user query 110 is provided to the query identifier 304 for identifying a responsive query 352 from intent-query mappings 350. Textual comparison techniques can be employed to identify the intent and retrieve the responsive query 352 which is mapped to the intent 112 from the intent-query mappings 350. The textual comparison techniques can include classifiers which can retrieve queries mapped to words identified as similar or synonymous with the intent 112. In an example, the responsive query 352 can be a structured query (e.g., a SQL query) which can be executed on the relational databases 122 for retrieval of the query results 354 relevant to the user query 110. The responsive query 352 is provided to the results retriever 306 which executes the responsive query 352 against the relational database 122 to retrieve the query results 354. The actual table of the relational database 122 responsive to the user query 110 can be identified from the slot 114. In an example, the responsive query 352 can include a search string which is formatted to retrieve data relevant to the user query 110 i.e., the query results 354 from one or more of the knowledge bases 124. The query results 354 can be provided to the chatbot interface 150 for being formatted into the answer 194.

Figure 4:
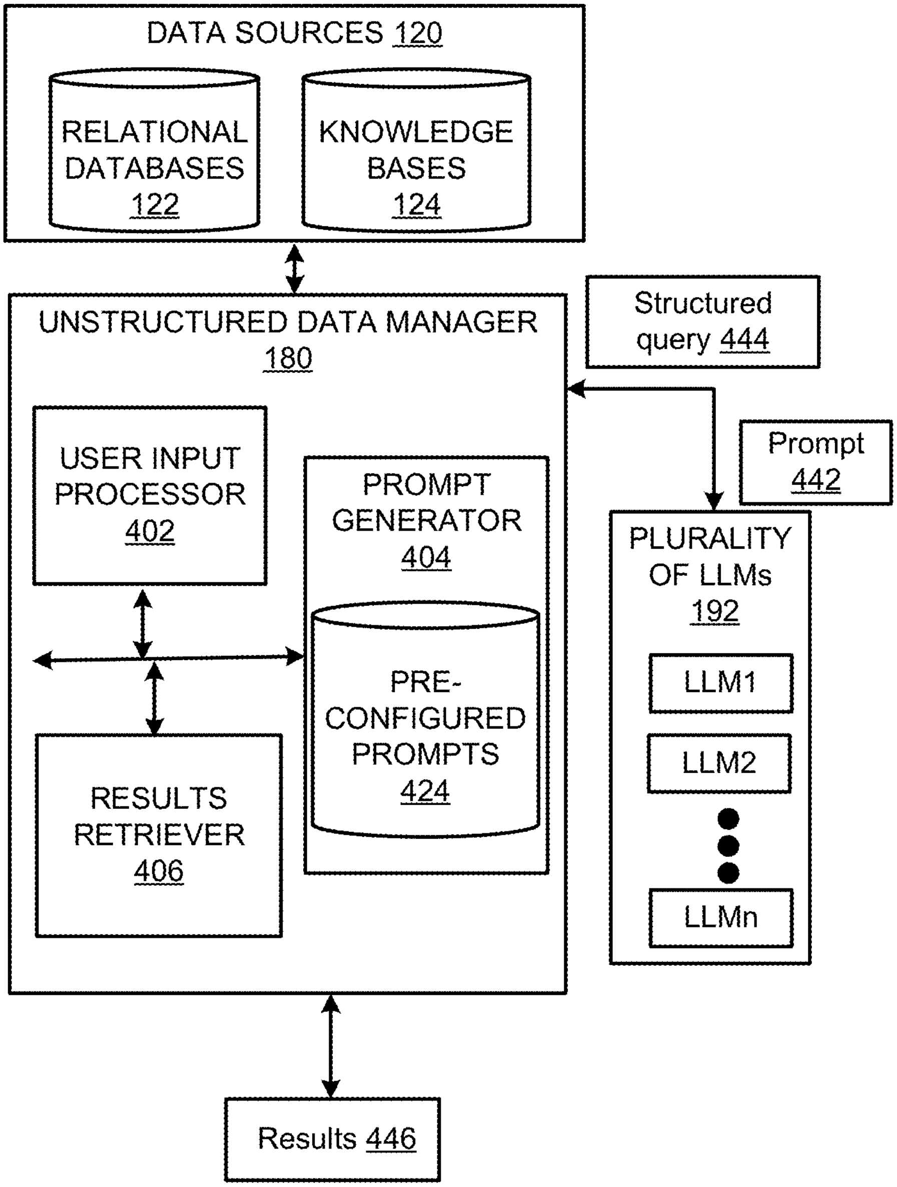
FIG. 4 shows a block diagram of an unstructured data manager in accordance with an example.

FIG. 4 shows a block diagram of the unstructured data manager 180 in accordance with an example. The unstructured data manager 180 includes a user input processor 402, a prompt generator 404, and a results retriever 406. The user input processor 402 processes the user query 110 when the confidence associated with the intent 112 is lower than the confidence limit 162. In an example, the user input processor 402 can associate the user context 132 with the user query 110. The user context 132 can include information related to the particular user and the session during which the user query 110 was received. The user context 132 can include the user's role and its associated rights/privileges, and user preferences. The user preferences gathered from previous conversations and the current conversation can be passed as part of the user context 132 to prompt for answers better curated to the user preferences. The relevant user context can be pulled from the knowledge bases 124. In addition, the user input processor 402 also retrieves database schema information of the relational databases 122 for structure query generation. Session-specific information e.g., device data of the user device 116, temporal and location information of the user device 116, etc. is also gathered for example, by extracting, the metadata of the user query 110. Storage of the session information within the user context 132 allows the continuation of sessions/conversations from previous sessions as needed.

The data thus gathered by the user input processor 402 including the user context 132 is provided to the prompt generator 404. The prompt generator 404 automatically identifies a prompt 442 to obtain a structured query 444 (e.g., SQL query) from one of the plurality of LLMs 192 which is currently in use. The prompt 442 can be identified from a datastore of pre-configured prompts 424. For example, a pre-configured prompt "Generate sql query for {query} based on the relational table with following details {table schema} {table description}. Explain the query. If no sql query can generate, say no sql query can be generated" can be retrieved from the datastore of pre-configured prompts 424 to obtain the structured query 444. The structured query 444 is executed against the relational databases 122 by the results retriever 406 for extracting the query results 446 for the user query 110 which may be formatted into the answer 194 by the chatbot interface 150. In an example, if a SQL query cannot be obtained from the current LLM, the prompt generator 404 may initially run another prompt from the data store of pre-configured prompts 424 to sub-divide the intent 112 into multiple sub-tasks and then generate prompts to obtain multiple SQL queries for each of the multiple sub-tasks. In case the sub-division into tasks also fails, the prompt generator 404 can implement an augmented retrieval process to obtain the relevant data/results. Under the augmented retrieval process (e.g., a retrieval augmented generation), an input is used to retrieve a set of relevant/supporting collection of documents/chunks from the knowledge bases 124 which may include the domain-specific information. In an example, a relevance threshold can be implemented to select the top n documents (wherein n is a natural number and n=1, 2, 3, . . . ). The documents/chunks can be concatenated as context with the original input prompt and fed to the currently selected LLM which produces the final output. The final output includes the structured query 444 which is executed by the results retriever 406 on the relational databases 122 for obtaining the query results 354.

3. Flowcharts

Figure 5:
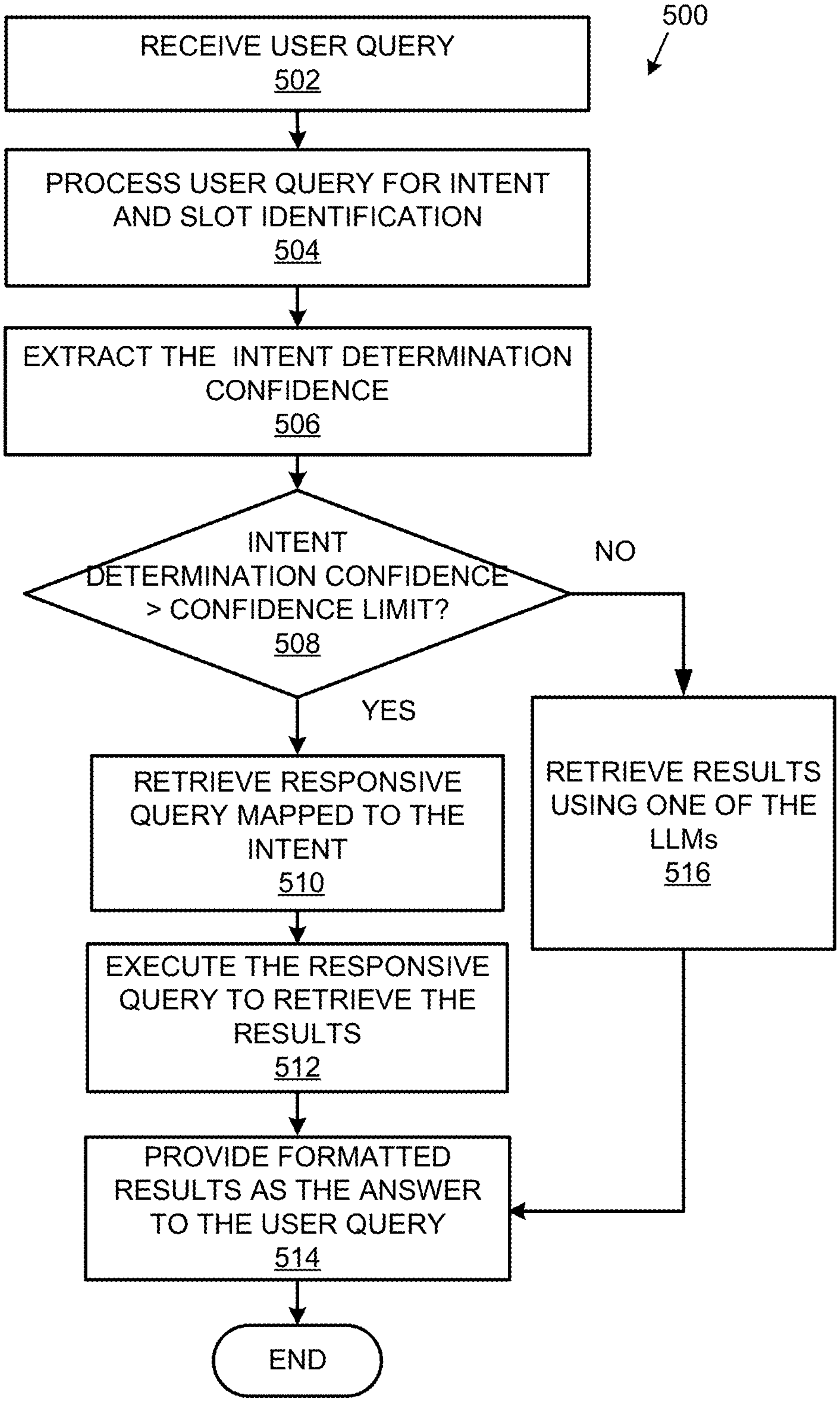
FIG. 5 shows a flow chart of a method of implementing a chatbot interface in accordance with the examples disclosed herein.

FIG. 5 shows a flow chart 500 of a method of implementing a chatbot interface using classical AI and generative AI techniques in accordance with the examples disclosed herein. At 502, the user query 110 is received. In an example, the user query 110 can include a textual input requesting pertinent information from a domain. Furthermore, the user query 110 can be issued from the user device 116 which can be logged into the apparatus 100 with a particular user profile. The chatbot interface 150 can operate as an automatic assistant and provide not only responses to specific queries but due to the implementation of the Gen. AI techniques may also provide accurate responses to general queries such as, "What are my priorities today?" The answer 194 can be provided in textual, or voice outputs as determined by the chatbot interface 150.

The user query 110 is processed by the intent-slot prediction model 152 at 504 for identification of the intent 112 and the slot 114. Known intents and slots can be configured for the intent-slot prediction model 152. These help to distinctly identify frequently used queries from users. More particularly, the intent-slot prediction model 152 can be trained on user queries along with the intents and slots labeled for such user queries. Different queries may have the same intent and the request for the same information can be framed differently. Additionally, the confidences associated with such predictions can also be extracted as output from the intent-slot prediction model 152. For example, a user query such as, "Provide the breakup for overstocked items" or "Can I get the breakdown for overstocked items for Supplier items?" can both be mapped to the intent "breakup_overstocked" on the slot "material_group". Therefore, in response to these prompts, the apparatus 100 may execute SQL queries against material tables to retrieve the overstocked items as the answer.

The apparatus 100 is configured with the confidence limit 162 for comparison of the confidences with which the intent 112 is determined. At 506, the confidence with which the intent 112 was determined (i.e., intent determination confidence) is extracted from the intent-slot prediction model 152 which can implement classical AI techniques. The confidence thus extracted is compared with the confidence limit 162. At 508, it is determined if the intent determination confidence is greater than the confidence limit 162. If the intent determination confidence is greater than the confidence limit 162, then the method moves to 510 to retrieve the responsive query 352 mapped to the intent 112 from the intent-query mappings 350. The responsive query 352 is executed on the relational databases 122 to obtain query results 354 at 512. The query results 354 are formatted at 514 and output as the answer 192 to the user query 110. If at 508, it is determined that the intent determination confidence is less than the confidence limit 162, the method moves to 516 wherein the query results 354 for the user query 110 are retrieved using one of the plurality of LLMs 192 as described herein. The method returns to 514 wherein the query results 354 are formatted and output as the answer 192 to the user query 110.

Figure 6:
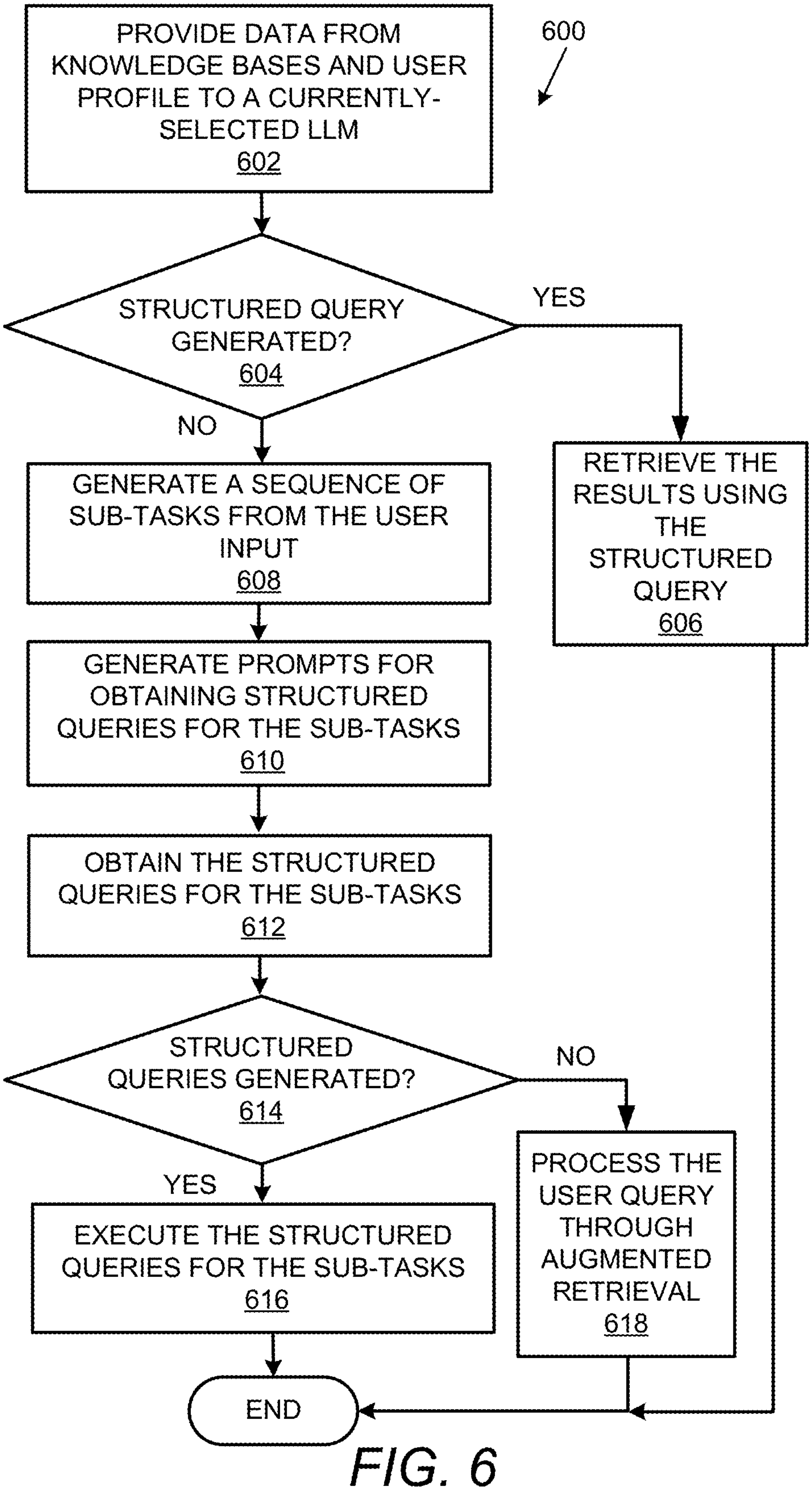
FIG. 6 shows a flowchart of a method of retrieving the results in accordance with the examples disclosed herein.

FIG. 6 shows a flowchart 600 of a method of retrieving the results when the intent determination confidence is less than the confidence limit in accordance with the examples disclosed herein. At 602, the data from the knowledge bases 124 along with the database schema of the relational databases 122 and the user profile 132 information can be collated and provided as a prompt to a currently selected LLM from the plurality of LLMs 192 for the automatic generation of a structured query. An example prompt may include, "Generate sql query for {query} based on the relational table with following details {table schema} {table description}. Explain the query. If no sql query can generate, say no sql query can be generated". It is determined at 604 if the structured query 444 is generated. If it is determined that the structured query 444 is generated at 604, by the currently selected LLM, the structured query 444 is executed on the relational databases 122 and the results 446 are retrieved at 606 and the method terminates on the end block. If it is determined at 606 that the structured query 446 was not generated by the currently selected LLM, the method moves to 608 wherein a sequence of sub-tasks is generated from the user input 110 via execution of a prompt selected from the datastore of pre-configured prompts 424. The selected prompt enables the generation of a sequence of sub-tasks on the user query 110 by the currently selected LLM. At 610, prompts are generated for a sequence of intents corresponding to the sequence of sub-tasks for obtaining the structured queries. In an example, the prompt that divides the user query 110 into multiple sub-tasks enables identification of the slot(s) i.e., one or more of the data sources 120 where the answers can be found. By way of illustration and not limitation, a prompt for generation of sub-tasks can include, "You are a {user_role}. You have the responsibility {role_responsibility}. What are the steps that are taken by an {user_role} to achieve {query}. Take a step-by-step approach in your response and provide the subtasks needed. In case, there are no subtasks, say there are no subtasks".

The prompts for the sub-tasks obtained at 610 are further executed by the currently selected LLM for obtaining the corresponding structured queries at 612. It is determined at 614 if the structured queries are generated for the sub-tasks. If it is determined at 614, that the structured queries are generated for the sub-tasks by the currently selected LLM, the method proceeds to 616 for the execution of the structured queries on the relational databases 122 in the same sequence corresponding to the sequence of the sub-tasks. If it is determined at 614 that the structured queries were not generated for the sub-tasks, the user query 110 is passed through the augmented retrieval approach at 618 to obtain the answers. The generation of the sub-tasks and the subsequent generation of SQL queries are carried out by the currently selected LLM in a process which may not be transparent to the user.

Figure 7:
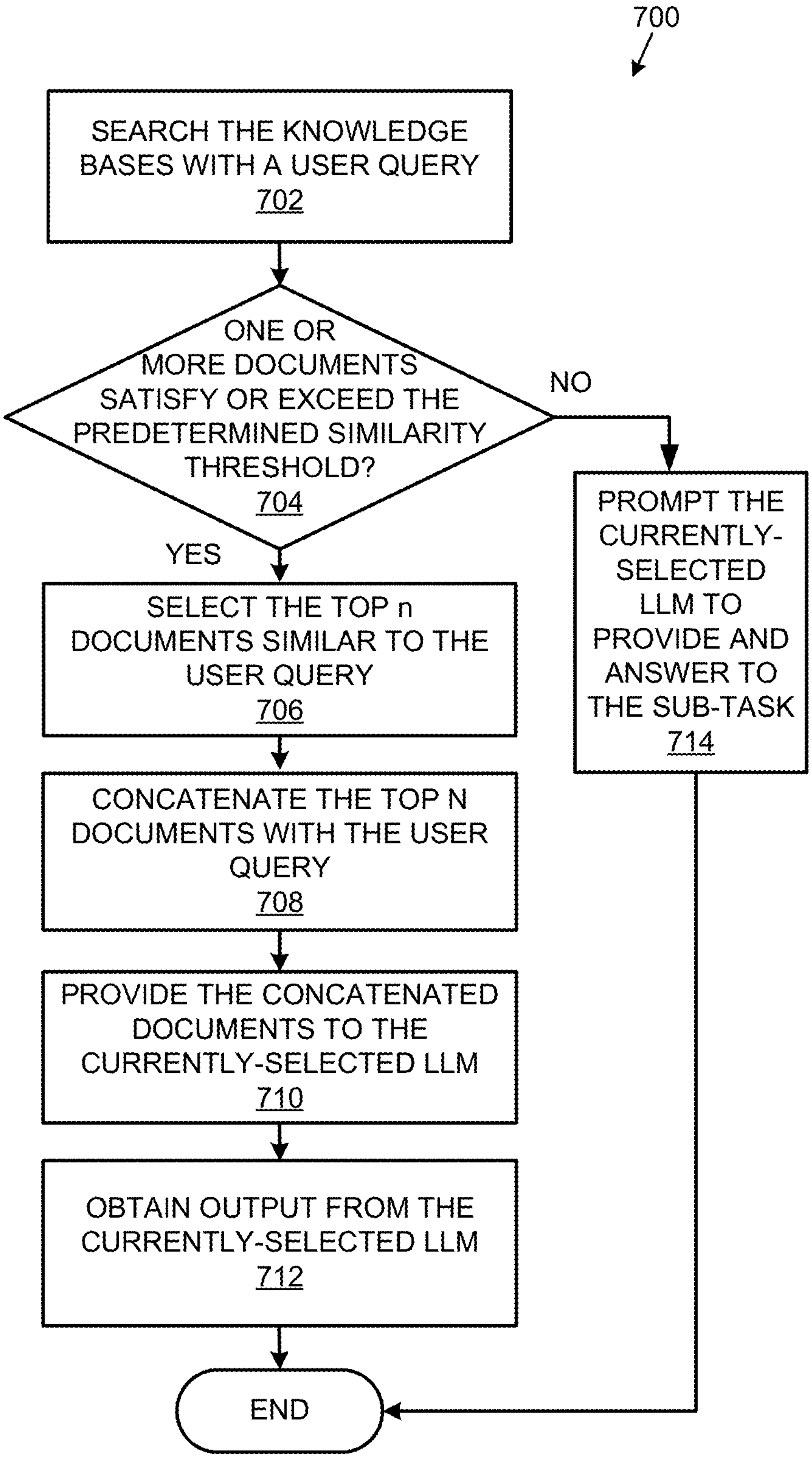
FIG. 7 shows a flowchart of the augmented retrieval process in accordance with some examples.

FIG. 7 shows a flowchart 700 of the augmented retrieval process for obtaining the answer 192 in accordance with some examples. The process begins at 702 wherein relevant documents are retrieved from the knowledge bases 124 by employing the user query 110 with textual search methodologies. At 704, it is determined if one or more documents satisfy a predetermined similarity threshold. If yes, the process moves to 706 wherein the top N documents (wherein N is a natural number and k=1, 2, 3, . . . ) that are similar to the user query 110 are selected based on the predetermined similarity threshold. At 708, the selected top N documents can be concatenated with the user query 110 and provided to the currently-selected LLM at 710. The relevant results are obtained as output from the currently-selected LLM at 712.

If at 704, it is determined that none of the documents retrieved from the knowledge bases 124 meet the predetermined similarity threshold, the currently selected LLM is prompted to provide an answer to the subtask and instructed to provide an explanation for the answer at 714 and the process terminates on the end block.

4. User Interfaces

Figure 8A:
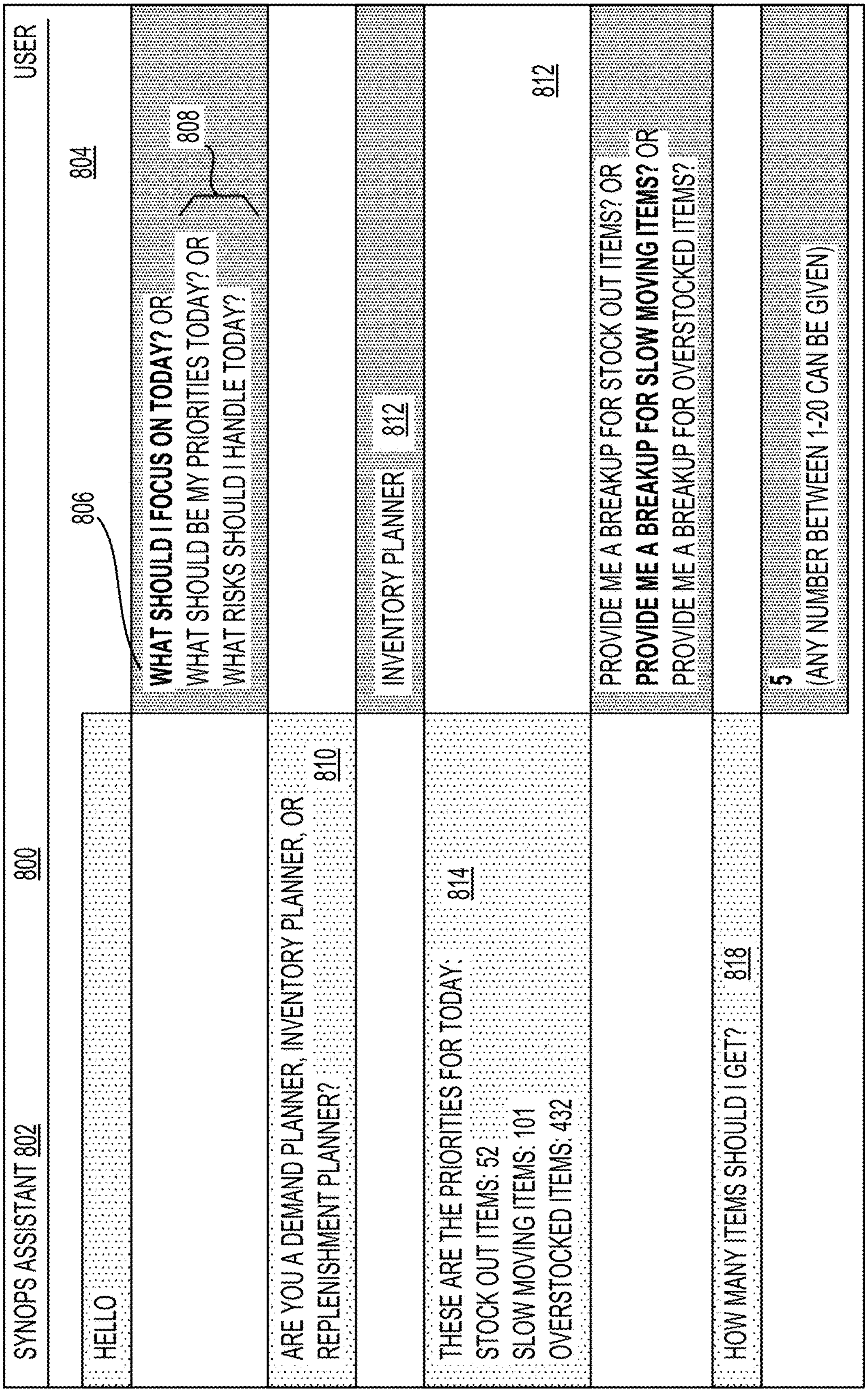
FIGS. 8A and 8B show a conversation between a user and an automated assistant in accordance with an example.
Figure 8B:
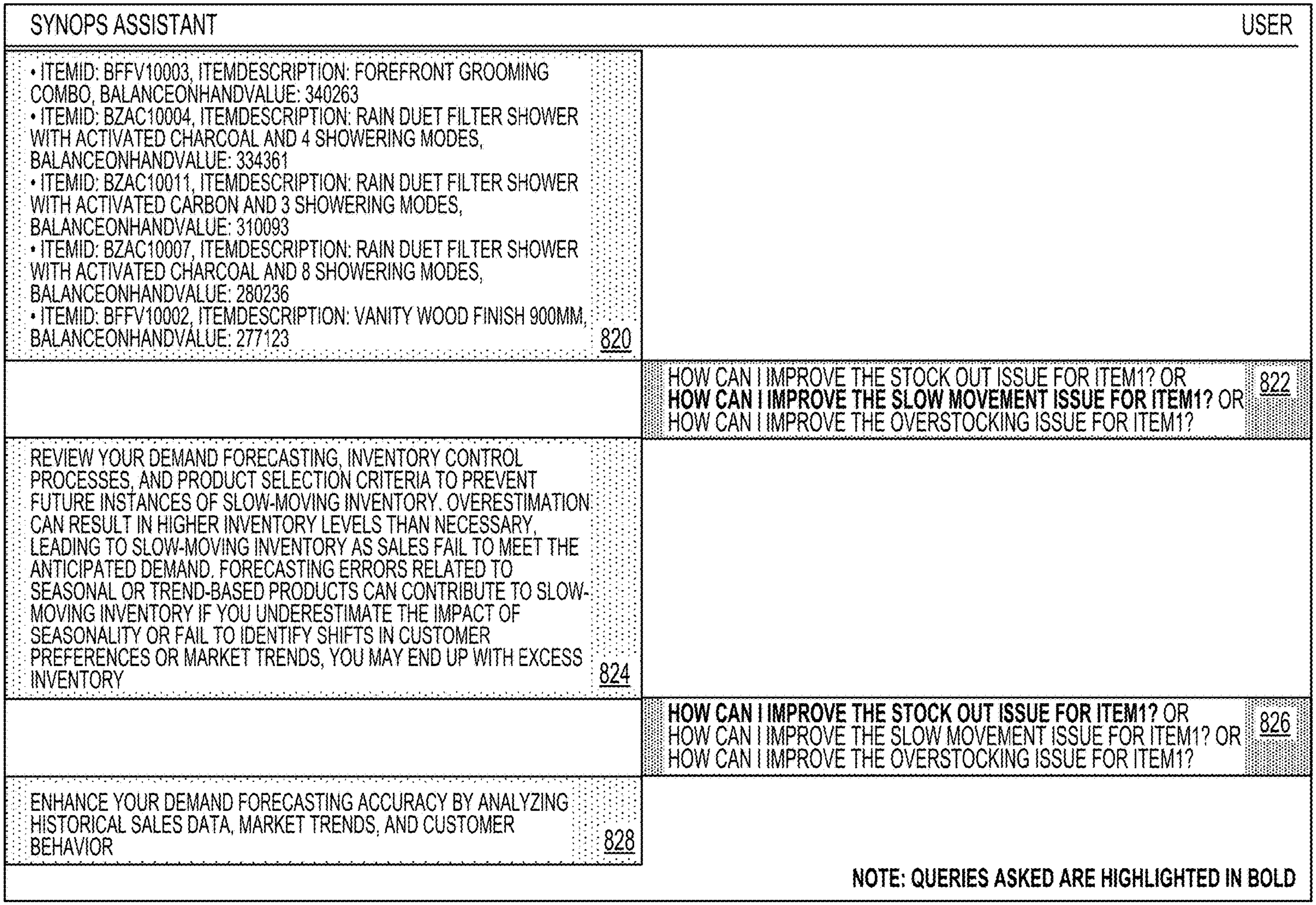

FIGS. 8A and 8B show a conversation between a user and an automated assistant implemented by the apparatus 100 in accordance with an example. The UI 800 shown in FIG. 8A illustrates the initial conversation between an automatic assistant 802 and the user 804. Initial user query 806 is shown in bold and the various forms the user query might take with the same intent are shown below at 808. In an example, the initial user query 806 may merely request data from one of the relational databases 122. The assistant 802 enquires about the user's role at 810 and based on the user's response 812, responds 814 to the initial user query 806. The user may issue further queries 816 to extract further details. The assistant requests clarification 818 before producing the response. In an example, the clarification may be requested subject to rule-based processing.

FIG. 8B shows the response 820 produced by the automatic assistant 802 upon receiving the user's clarification. Again, the user may issue other follow-up queries 822, 826 which cannot be merely answered by reproducing data from the relational databases 122 but requires a sophisticated natural language answer which may combine information of the plurality of data sources 120. Other forms of follow-up queries are also shown. In particular, the assistant's response 824 to the follow-up query 822 constitutes a comprehensive natural language response listing the various causes for slow-moving items. Similarly, the response 828 to the follow-up query 826 is a natural language response. The assistant's responses 824 and 828 are generated by one of the plurality of LLMs 192 in accordance with the methods disclosed herein.

5. System Diagram

Figure 9:
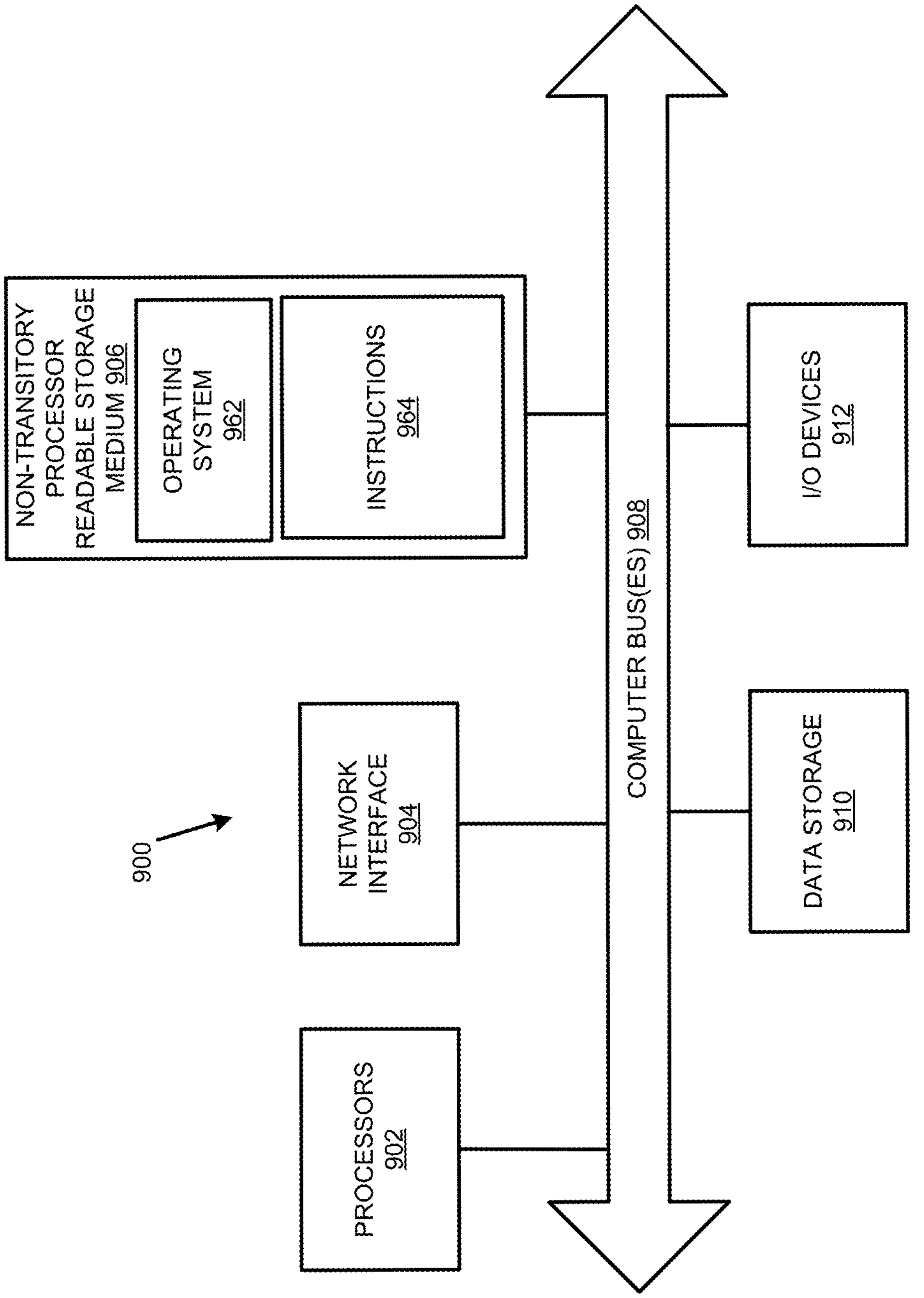
FIG. 9 illustrates a computer system that may be used to implement the Gen. AI-based chatbot apparatus in accordance with the examples disclosed herein.

FIG. 9 illustrates a computer system 900 that may be used to implement the Gen. AI-based chatbot apparatus 100 in accordance with the examples disclosed herein. More particularly, computing machines such as desktops, laptops, smartphones, tablets, and wearables which may be used to generate or access the data from the apparatus 100 may have the structure of the computer system 900. The computer system 900 may include additional components not shown and some of the process components described may be removed and/or modified. In another example, a computer system 900 can sit on external cloud platforms such as Amazon Web Services, AZURE® cloud or internal corporate cloud computing clusters, or organizational computing resources, etc.

The computer system 900 includes hardware processor(s) 902, such as a central processing unit, ASIC or another type of hardware processing circuit, input/output (I/O) devices 912, such as a display, mouse keyboard, etc., a network interface 904, such as a Local Area Network (LAN), a wireless 802.11x LAN, a 3G, 4G or 5G mobile WAN or a WiMax WAN, and a processor-readable medium 906. Each of these components may be operatively coupled to a bus 908. The processor-readable or computer-readable medium 906 may be any suitable medium that participates in providing instructions to the processor(s) 902 for execution. For example, the processor-readable medium 906 may be a non-transitory or non-volatile medium, such as a magnetic disk or solid-state non-volatile memory, or a volatile medium such as RAM. The instructions or modules stored on the processor-readable medium 906 may include machine-readable instructions 964 executed by the processor(s) 902 that cause the processor(s) 902 to perform the methods and functions of the AI-based filter apparatus 100.

The chatbot apparatus 100 may be implemented as software or machine-readable instructions stored on a non-transitory processor-readable storage medium and executed by one or more processors 902. For example, the computer-readable storage medium or non-transitory processor-readable medium 906 may store an operating system 962, such as MAC OS, MS WINDOWS, UNIX, or LINUX, and code/instructions 964 for the AI-based filter apparatus 100. The operating system 962 may be multi-user, multiprocessing, multitasking, multithreading, real-time, and the like. For example, during runtime, the operating system 962 is running and the code for the Generative AI-based chatbot apparatus 100 is executed by the processor(s) 902.

The computer system 900 may include a data storage 910, which may include non-volatile data storage. The data storage 910 stores any data used by the AI-based filter apparatus 100. The data storage 910 may be used as local data storage of the apparatus 100 to store the user queries, retrieved results, formatted answers, confidences, and other data generated or used by the Gen. AI-based chatbot apparatus 100.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A Generative Artificial Intelligence (AI) based chatbot apparatus, comprising:

at least one hardware processor; and at least one non-transitory processor-readable medium storing instructions for and the at least one hardware processor executing:

a chatbot interface that:

receives a user query in a natural language, the user query includes an intent indicative of a task to be executed and a slot indicative of relevant entities from a plurality of data sources to be used for the task execution, wherein the plurality of data sources include one or more relational databases and one or more unstructured knowledge bases;

an intent-slot prediction model trained with training data including various forms of user queries labeled with corresponding intents and slots, the intent-slot prediction model that:

outputs predictions for the intent and the slot based on the user query, and outputs confidences associated with the predictions;

an orchestrator that:

determines if the confidence associated with the intent prediction is above or below a configured confidence limit;

a structured data manager that:

retrieves results for the user query from the one or more relational databases with a structured query mapped to the intent if the prediction for the intent by intent-slot prediction model has a higher accuracy than the configured confidence limit;

an unstructured data manager that:

retrieves results for the user query by executing an automatically-generated structured query on the one or more relational databases, if the prediction for the intent has a lower accuracy than the configured confidence limit, wherein the automatically-generated structured query is generated by a currently selected Large Language Model (LLM), wherein the unstructured data manager prompts the currently selected LLM to generate the automatically-generated structured query and enables the currently selected LLM to output a corresponding confidence score that the automatically-generated structured query is responsive to the intent conveyed in the user query, wherein in response to the confidence score associated with the automatically-generated structured query being less than a predetermined threshold confidence score, the unstructured data manager employs an augmented retrieval process with a prompt that contains instructions to obtain answers from the plurality of data sources, wherein the augmented retrieval process includes retrieving, from the one or more unstructured knowledge bases of the plurality of data sources, a set of chunks having a predefined level of similarity with the intent to obtain answers for the user query; and a Generative AI switch (Gen. AI) that:

switches an LLM from a plurality of LLMs based on the user query and user feedback, wherein each LLM of the plurality is implemented using a different algorithm, and wherein the Gen. AI switch further applies a rule-based procedure to deselect the currently selected LLM and select another LLM from the plurality of LLMs based on the user query and the user feedback.

2. The Generative AI-based chatbot apparatus of claim 1, wherein the chatbot interface executed by the at least one hardware processor further:

formats the retrieved results as an answer to the user query; and outputs the answer to a user device.

3. The Generative AI-based chatbot apparatus of claim 1, wherein the chatbot interface executed by the at least one hardware processor further:

formats the answer as one or more of a textual response and, an audio response.

4. The Generative AI-based chatbot apparatus of claim 1, further comprises the plurality of data sources wherein the one or more knowledge bases include at least user profile information and database schema of the one or more relational databases.

5. The Generative AI-based chatbot apparatus of claim 1, wherein the orchestrator executed by the at least one hardware processor further:

forwards, based on the slot, the user query to one of the structured data manager and the unstructured data manager if the confidence associated with the intent prediction is above the configured confidence limit; and forwards the user query to the unstructured data manager if the confidence associated with the intent prediction is below the configured confidence limit.

6. The Generative AI-based chatbot apparatus of claim 1, wherein the structured data manager executed by the at least one hardware processor retrieves the results from the one or more relational databases by:

determining that the accuracy of the intent associated with the user query is above the configured confidence limit.

7. The Generative AI-based chatbot apparatus of claim 6, wherein the structured data manager executed by the at least one hardware processor retrieves the results from the one or more relational databases by:

selecting the structured query from preconfigured mappings based on the intent.

8. The Generative AI-based chatbot apparatus of claim 7, wherein in the preconfigured mappings the intent is extracted from the user query and is provided to a query identifier for identifying a responsive query from intent-query mappings.

9. The Generative AI-based chatbot apparatus of claim 1, wherein the unstructured data manager executed by the at least one hardware processor retrieves the results from the plurality of data sources by:

determining that a prompt can be automatically generated from the user query, wherein the prompt is provided to the currently selected LLM for automatic generation of the structured query corresponding to the intent specified in the user query.

10. The Generative AI-based chatbot apparatus of claim 9, wherein if it is determined that the prompt can be automatically generated from the user query the unstructured data manager executed by the at least one hardware processor retrieves the results from the plurality of data sources by:

identifying within the prompt, a context including a user profile associated with the user query and a selection of the currently selected LLM from the plurality of LLMs.

11. The Generative AI-based chatbot apparatus of claim 9, wherein if it is determined that the prompt cannot be automatically generated from the user query the unstructured data manager executed by the at least one hardware processor retrieves the results from the plurality of data sources by:

generating a sequence of sub-tasks for the task conveyed in the intent; and automatically generating a sequence of structured queries corresponding to the sequence of sub-tasks.

12. The Generative AI-based chatbot apparatus of claim 11, wherein if the sequence of structured queries cannot be automatically generated, the unstructured data manager executed by the at least one hardware processor retrieves the results from the plurality of data sources by:

executing a search of the knowledge bases with the user query; and selecting top n documents that exceed a predetermined similarity threshold with the user query, wherein n is a natural number greater than or equal to 1; and obtaining the results from the currently-selected LLM by providing an input of the top n documents concatenated with the user query.

13. The Generative AI-based chatbot apparatus of claim 1, wherein the at least one non-transitory processor-readable medium storing instructions for and the at least one hardware processor further executing:

a feedback processor that:

receives the user feedback regarding the retrieved results provided in response to the user query.

14. The Generative AI-based chatbot apparatus of claim 1, wherein the plurality of LLMs include subsets of customized LLMs wherein each subset of customized LLMs is customized for a given domain, wherein each LLM within the set of customized LLMs is further trained to identify a corresponding intent.

15. The Generative AI-based chatbot apparatus of claim 1, wherein the plurality of LLMs are trained for generating structured queries.

16. A Generative Artificial Intelligence (Gen. AI) based data retrieval method, comprising:

receiving a user query in a natural language, the user query includes an intent indicative of a task to be executed and a slot indicative of one or more relevant entities from a plurality of data sources to be used for the task execution, wherein the plurality of data sources include one or more relational databases and one or more knowledge bases storing unstructured data;

extracting predictions for the intent and the slot based on the user query along with confidences associated with the predictions, wherein extracting the predictions for the intent and the slot by training an intent-slot prediction model with training data including various forms of user queries labeled with corresponding intents and slots;

determining that the confidence associated with the intent prediction is below a configured confidence limit;

retrieving results for the user query from the one or more of relational databases and the knowledge bases with an automatically generated structured query, wherein the automatically generated structured query is generated by a currently selected Large Language Model (LLM) from a plurality of LLMs, wherein an unstructured data manager prompts the currently selected LLM to generate the automatically-generated structured query and enables the currently selected LLM to output a corresponding confidence score that the automatically-generated structured query is responsive to the intent conveyed in the user query, wherein in response to the confidence score associated with the automatically-generated structured query being less than a predetermined threshold confidence score, the unstructured data manager employs an augmented retrieval process with a prompt that contains instructions to obtain answers from the plurality of data sources, wherein the augmented retrieval process includes retrieving, from the one or more knowledge bases of the plurality of data sources, a set of chunks having a predefined level of similarity with the intent to obtain answers for the user query; and switching based on the user query and user feedback, the currently selected LLM by selecting another LLM from the plurality of LLMs, wherein each of the plurality of LLMs is based on a different algorithm, and wherein the switching comprises implementing a rule-based procedure to deselect the currently selected LLM based on the user feedback, and select another LLM from the plurality of LLMs.

17. A Generative Artificial Intelligence (Gen. AI) based data retrieval method of claim 16, comprising:

receiving answers with high negative feedback counts so that the currently selected LLM can provide better results.

18. A non-transitory processor-readable storage medium comprising machine-readable instructions that cause a processor to:

receive a user query in a natural language, the user query includes an intent indicative of a task to be executed and a slot indicative of a data source from a plurality of data sources to be used for the task execution, wherein the plurality of data sources include one or more relational databases and one or more knowledge bases storing unstructured data;

train the intent-slot prediction model with training data including various forms of user queries labeled with corresponding intents and slots, and obtain predictions for the intent and identification of the slot based on the user query and confidences associated with the predictions;

determine if the confidence associated with the intent prediction is above or below a configured confidence limit;

retrieve results for the user query from the one or more relational databases with a structured query mapped to the intent if the prediction for the intent has a higher accuracy than the configured confidence limit;

retrieve results for the user query by executing a structured query on the one or more relational databases if the prediction for the intent has a lower accuracy than the configured confidence limit, wherein the structured query is automatically generated by a currently selected Large Language Model (LLM), wherein an unstructured data manager prompts the currently selected LLM to generate the automatically-generated structured query and enables the currently selected LLM to output a corresponding confidence score that the automatically-generated structured query is responsive to the intent conveyed in the user query, wherein in response to the confidence score associated with the automatically-generated structured query being less than a predetermined threshold confidence score, the unstructured data manager employs an augmented retrieval process with a prompt that contains instructions to obtain answers from the plurality of data sources, wherein the augmented retrieval process includes retrieving, from the one or more knowledge bases of the plurality of data sources, a set of chunks having a predefined level of similarity with the intent to obtain answers for the user query; and switch an LLM from a plurality of LLMs based on the user query and user feedback, wherein each LLM of the plurality is implemented using a different algorithm, and wherein the Gen. AI switch further applies a rule-based procedure to deselect the currently selected LLM and select another LLM from the plurality of LLMs based on the user query and the user feedback.

19. The non-transitory processor-readable storage medium of claim 18 including further instructions that cause the processor to:

format the retrieved results as an answer to the user query; and output the answer via a chatbot output interface.

20. The non-transitory processor-readable storage medium of claim 18, wherein the structured data manager executed by the at least one hardware processor retrieves the results from the one or more relational databases by:

selecting, by the processor, the structured query from preconfigured mappings based on the intent, wherein in the preconfigured mappings the intent is extracted from the user query and is provided to a query identifier for identifying a responsive query from intent-query mappings.

* * * * *